US011470372B2

(12) United States Patent
Cui et al.

(10) Patent No.: US 11,470,372 B2
(45) Date of Patent: Oct. 11, 2022

(54) ADAPTIVE BITRATE ADJUSTMENT METHOD FOR MULTI-USER INTERACTIVE LIVE BROADCAST

(71) Applicant: TSINGHUA UNIVERSITY, Beijing (CN)

(72) Inventors: Yong Cui, Beijing (CN); ZiYi Wang, Beijing (CN); XiaoYu Hu, Beijing (CN)

(*) Notice: Subject to any disclaimer, the term of this patent is extended or adjusted under 35 U.S.C. 154(b) by 0 days.

(21) Appl. No.: 17/424,796

(22) PCT Filed: Nov. 26, 2019

(86) PCT No.: PCT/CN2019/120769
§ 371 (c)(1),
(2) Date: Jul. 21, 2021

(87) PCT Pub. No.: WO2021/097865
PCT Pub. Date: May 27, 2021

(65) Prior Publication Data
US 2022/0141514 A1    May 5, 2022

(30) Foreign Application Priority Data

Nov. 19, 2019  (CN) .......................... 201911135525.5

(51) Int. Cl.
| H04N 7/173 | (2011.01) |
| H04N 21/2662 | (2011.01) |
| H04N 21/2187 | (2011.01) |
| H04N 21/24 | (2011.01) |

(52) U.S. Cl.
CPC ..... *H04N 21/2662* (2013.01); *H04N 21/2187* (2013.01); *H04N 21/2402* (2013.01)

(58) Field of Classification Search
CPC .......... H04N 21/2662; H04N 21/2187; H04N 21/2402
See application file for complete search history.

(56) References Cited

U.S. PATENT DOCUMENTS

2011/0179186 A1* 7/2011 Li ........................... H04L 65/80
709/231
2014/0310755 A1* 10/2014 Stafford ........... H04N 21/43615
725/81

(Continued)

FOREIGN PATENT DOCUMENTS

CN            110300315 A      10/2019

*Primary Examiner* — Gigi L Dubasky
(74) *Attorney, Agent, or Firm* — Novoclaims Patent Services LLC; Mei Lin Wong

(57) ABSTRACT

Disclosed is an adaptive bitrate adjustment method for multi-user interactive live broadcast, comprising the following steps: 1) calculating a target bitrate of each pair of sending end and receiving end by using a non-linear programming method; 2) adjusting and online updating target bitrate by buffer feedback to eliminate system errors during modeling and measurement; and 3) clustering the target bitrate based on the QoE loss to obtain final actual bitrate. In the present invention, the user experience of the broadcaster is maximized and real-time interaction is achieved by reasonably adjusting the bitrate of each broadcaster end in a multi-user interactive live broadcast scenario and considering various constraint conditions.

3 Claims, 2 Drawing Sheets

(56) References Cited

U.S. PATENT DOCUMENTS

| | | | |
|---|---|---|---|
| 2016/0057064 A1* | 2/2016 | Appleby | H04L 47/25 709/219 |
| 2016/0173875 A1* | 6/2016 | Zhang | H04N 19/124 375/240.03 |
| 2018/0109468 A1* | 4/2018 | Sridhar | H04L 5/006 |
| 2020/0366948 A1* | 11/2020 | Ye | H04N 21/2402 |

* cited by examiner

ADAPTIVE BITRATE ADJUSTMENT METHOD FOR MULTI-USER INTERACTIVE LIVE BROADCAST

BACKGROUND OF THE PRESENT INVENTION

Field of Invention

The present invention relates to a streaming media, and particularly relates to an adaptive bitrate adjusting method for multi-user interactive live broadcast.

Background of the Invention

DESCRIPTION OF RELATED ARTS

Current multi-user video conferencing systems focus on minimizing the cost of service providers and user delays, concern about the choice of transcoding servers and do not take into account different preferences and priority issues between multiple users. In addition, users of traditional video conferences take turns to speak, and the tolerable delay is about 400 milliseconds while the interaction between different broadcasters is more frequent in the multi-user interactive live broadcast environment, and the tolerable delay is about 100 milliseconds, and the traditional video conferencing solutions cannot meet the requirement.

A single video source to a large number of viewers is considered for existing live broadcast environment, while in the multiple-to-multiple microphones connecting scenarios, there may be more constraints (eg, constraints on uplink and downlink bandwidth) needed to be considered and the need for real-time interaction.

SUMMARY OF THE PRESENT INVENTION

In order to overcome the above shortcomings in the existing arts, an object of the present invention is to provide an adaptive bit rate adjustment method for multi-user interactive live broadcasts, which comprehensively plans and takes into account various constraints, maximizes the broadcaster's user experience, and completes real-time interactions by reasonably adjusting the bitrate of the broadcaster in the multi-user interactive live broadcast environment.

In order to achieve the above objective, the technical solution adopted by the present invention is:

an adaptive bitrate adjustment method for multi-user interactive live broadcast, which comprises the following steps:

1) calculating a target bitrate for each pair of sending end and receiving end by using a nonlinear programming method, 2) online adjusting and updating target bitrate by buffer feedback in order to eliminate system errors during modeling and measurement, 3) clustering the target bitrate based on QoE loss to obtain a final actual bitrate.

In practical application, calculate historical data of uplink and downlink bandwidth, make predictions, and count the receiving buffer of the broadcaster. Then adopt a periodic bitrate adjustment strategy which utilizes the adaptive bitrate adjustment method at equal intervals and inputs new statistical data. According to the new statistical data, calculate the new bitrate as the encoding parameter and output to the encoder, and finally a feedback closed loop is formed.

Compared with existing arts, the present invention can reasonably adjust the bitrate generated by the broadcaster based on the given uplink and downlink bandwidth and the buffer information of the broadcaster end, and maximize the QoE of the system.

DETAILED DESCRIPTION OF THE PREFERRED EMBODIMENT

The embodiments of the present invention are described in detail below in connection with the accompanying drawings and embodiments.

Figure 1:
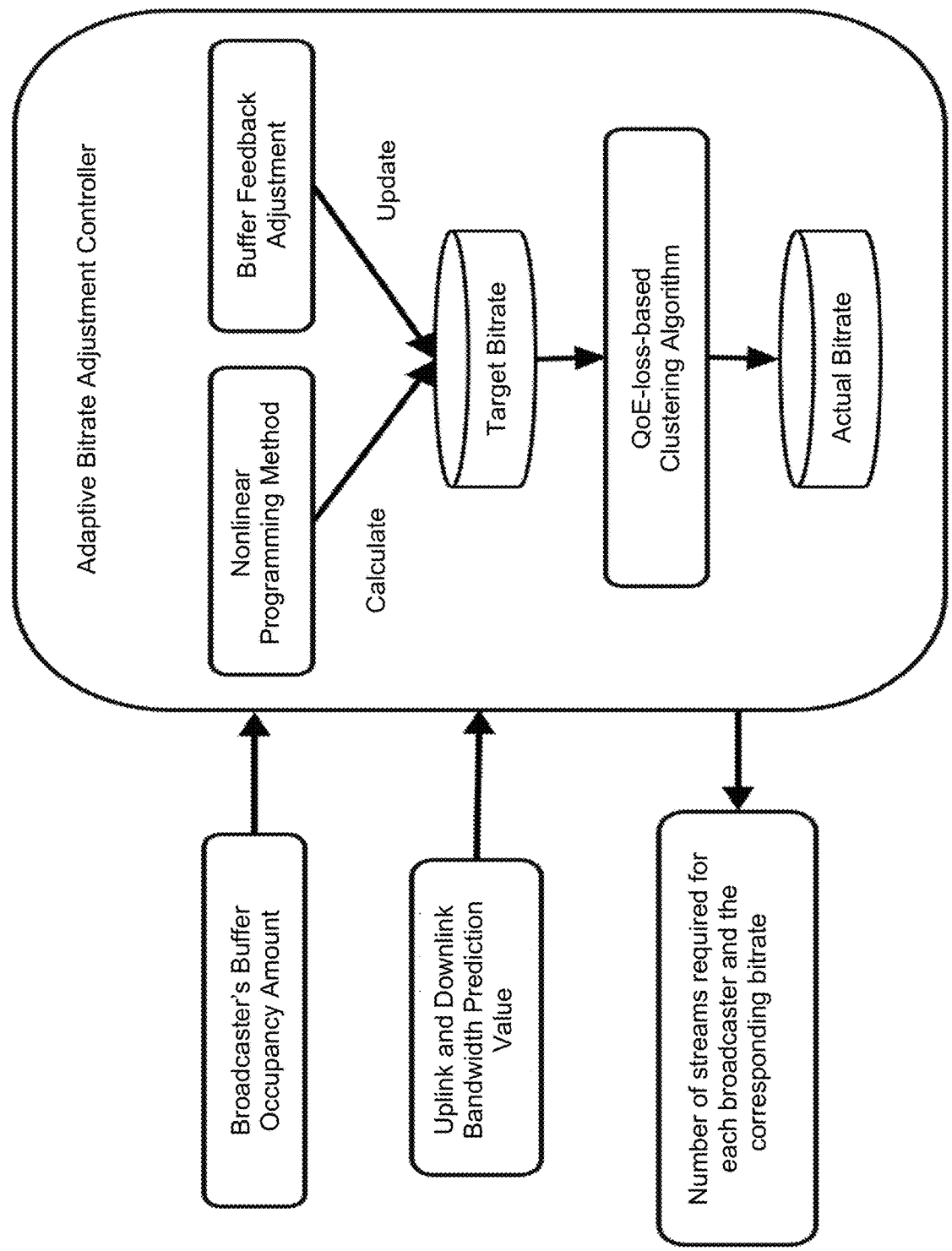
FIG. 1 is a flow chart of an adaptive bitrate adjustment method.

Referring to FIG. 1, the present invention provides an adaptive bitrate adjustment method for multi-user interactive live broadcast, which mainly comprises the following steps:

Step (1), an adaptive bitrate adjustment controller at a server end reads a buffer occupancy amount of each broadcaster and a bandwidth predicted value of uplink and downlink. That is, the input of the present invention is the predicted value of uplink and downlink bandwidth and the receiving buffer of the broadcaster end.

Step (2), calculate a target bitrate by using a nonlinear programming method. Specifically, in order to maximize the system QoE, calculate the target bitrate $\hat{R}_w^{ij}$ for each pair of sending end and receiving end, and the limitations of uplink and downlink bandwidth and the receiving buffer of the broadcaster end are required to be considered, that is:

$$\max_{\hat{R}_w^{ij}} \quad QoE$$

$$\text{s.t.} \quad \hat{B}_{w+1}^{down(ij)} = \left(B_w^{down(ij)} - \frac{S_w^{ij}}{C_w^{down(ij)}}\right)_+ + D_w^{ij}$$

$$\max_j \{\hat{R}_w^{ij}\} \leq C_w^{up(i)}$$

$$\sum_i \hat{R}_w^{ij} \leq C_w^{down(j)}$$

Wherein each parameter is defined as:

$\hat{R}_w^{ij}$: The target bitrate corresponding to the wth frame sent by the broadcaster i to the broadcaster j;

$\hat{B}_w^{down(ij)}$: The target buffer amount of the receiving end when the broadcaster j starts to receive the wth frame from the broadcaster i;

$B_w^{down(ij)}$: The actual buffer amount of the receiving end when the broadcaster j starts to receive the wth frame from the broadcaster i;

$S_w^{ij}$: The frame size corresponding to the wth frame sent by the broadcaster i to the broadcaster j;

$D_w^{ij}$: The frame duration corresponding to the wth frame sent by the broadcaster i to the broadcaster j;

$C_w^{up(i)}$: The average uplink bandwidth when the broadcaster i sends the wth frame;

$C_w^{down(j)}$: The average downlink bandwidth when the broadcaster j receives the wth frame;

$(x)_+ = \max\{x, 0\}$: the maximum value taken from x and 0;

$C_w^{down(ij)}$ refers to the average downlink bandwidth when the broadcaster j receives the wth frame from the broadcaster i, and $\Sigma_i C_w^{down(ij)} = C_w^{down(j)}$.

QOE: Quality of Experience, user experience, which mainly includes the following four items:

(1) Cumulative video quality: $\Sigma_{w=1}^{K} q(R_w^{ij})$ (2) Cumulative Jitter of video quality: $\Sigma_{w=1}^{K-1} |q(R_{w+1}^{ij}) - q(R_w^{ij})|$ (3) Cumulative stall time:

$$\sum_{w=1}^{K} \left( \frac{S_w^{ij}}{C_w^{down(j)}} - B_w^{down(ij)} \right)_+$$

(4) Delay: $T_K^{down(ij)} - T_K^{up(i)} + B_K^{down(ij)}$

Where q( ) is a function between characterized video quality and video bitrate (using a logarithmic function in the current scheme), $T_w^{up(i)}$ is the system time when the broadcaster i starts to generate the wth frame, $T_w^{down(ij)}$ is the system time when the broadcaster j starts to receive the wth frame from the broadcaster i, K is the number of accumulated statistical frames.

Step (3), in order to eliminate system errors during modeling and measurement, the present invention adjusts and online updates the target bitrate $\hat{R}_w^{ij}$ through buffering feedback. Based on the buffer occupancy and bandwidth conditions at the start of downloading the w-th frame of a given broadcaster, it is possible to estimate the buffer occupancy of the w+1-th frame when the bandwidth is unchanged. However, when the broadcaster actually starts to download the w+1-th frame, the actual buffer occupancy can be obtained. The difference between the target value and the actual value reflects the rate of change of bandwidth and determines the magnitude of bitrate adjustment. The PI controller is mainly used in the process of feedback adjustment. The specific steps are as follows:

Step (3a), in order to eliminate the prediction errors, use the proportional controller to calculate the difference between the actual buffer occupancy and the target buffer occupancy: $Z_p = K_p (B_{w+1}^{down(ij)} - \hat{B}_{w+1}^{down(ij)})$, where $Z_p$ is the proportional term of the PI controller, and $K_p$ is the proportional coefficient of the PI controller.

Step (3b), in order to eliminate accumulated systematic errors, use the integral controller to integrate the difference between the actual buffer occupancy and the target buffer occupancy: $Z_i = K_i \int_0^{w+1} (B_t^{down(ij)} - \hat{B}_t^{down(ij)}) dt$, where $Z_i$ is the integral term of the PI controller, and $K_i$ is the integral coefficient of the PI controller.

Step (3c), based on buffer feedback adjustment to obtain the final updated target bitrate value: $\hat{R}_{w+1}^{ij} = \hat{R}_w^{ij} + Z_p + Z_i$.

Step (4), in order to solve the bandwidth limitation at the uplink and the limitation of the encoding ability of the sending end, the present invention clusters the target bitrate to obtain the final actual bitrate. The present invention defines QoE loss as $QoE(R_w^{ij}) - QoE(\hat{R}_w^{ij})$, performing K—means clustering in the space formed by the bitrate and the corresponding QoE (in this space, the metric is the QoE distance rather than the geometric distance) to obtain the value of actual bitrate $R_w^{ij}$ that minimizes the overall QoE loss.

Step (5), output the number of streams required for each broadcaster and the corresponding bitrate $R_w^{ij}$, that is, the actual bitrate corresponding to the wth frame sent by the broadcaster i to the broadcaster j.

Figure 2:
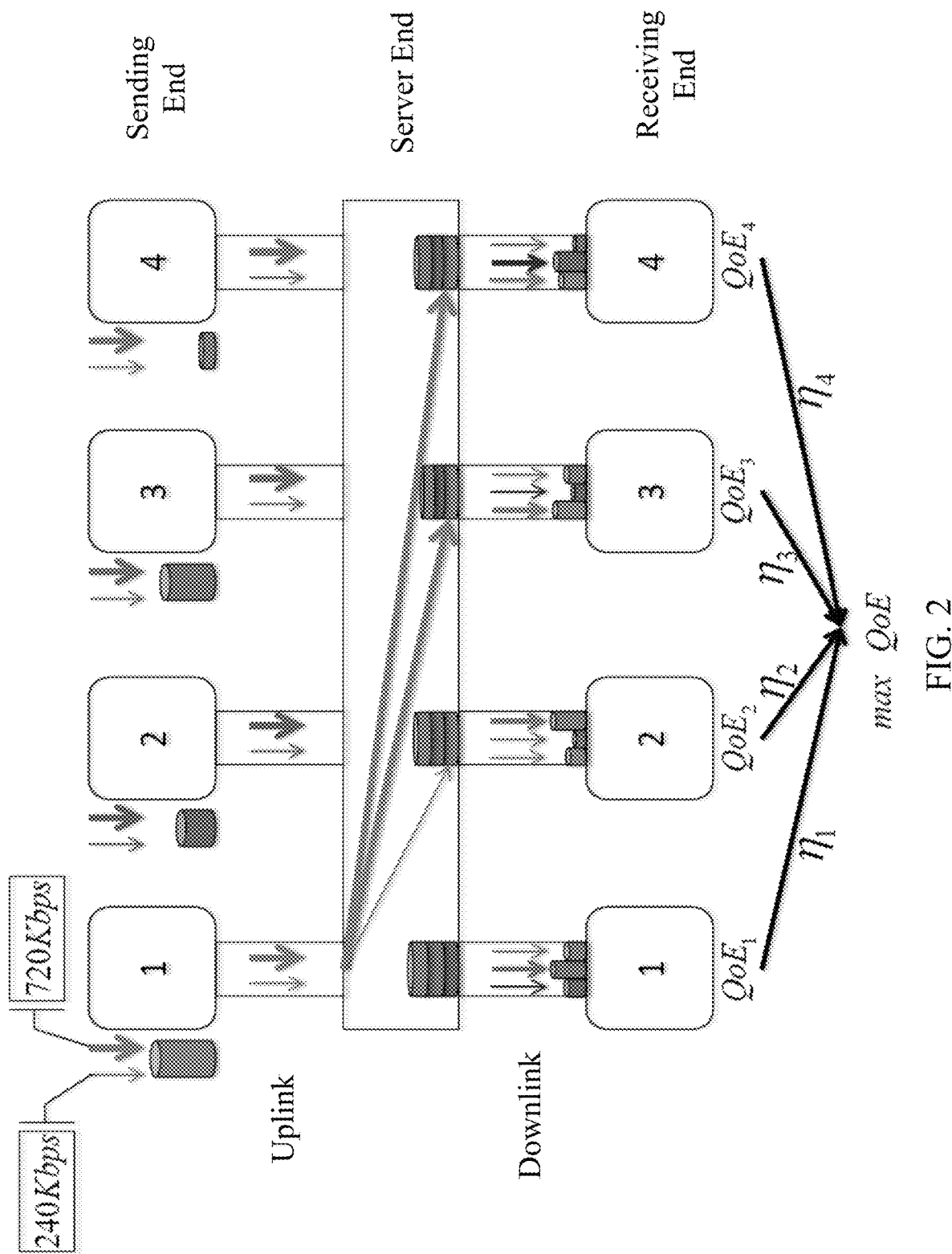
FIG. 2 is an architecture diagram of multi-user interactive live broadcast.

FIG. 2 is a system architecture diagram, which mainly includes three parts: a sending end, a server end and a receiving end. In practice, each broadcaster is both a sending end and a receiving end. The sending end generates and transmits the SVC-encoded multi-bitrate video to the server end. The server end sends the appropriate SVC layers to the corresponding receiving end. The receiving end process buffering and playing. The adaptive bitrate adjustment scheme operates at the server end, comprehensively considers the uplink and downlink bandwidth and the buffer condition of the receiving end, determines the bitrate decision with the maximum overall QoE, notifies the sending end, and then the sending end generates the corresponding bitrate according to the requirement and performs SVC encoding.

In actual applications, it is necessary to statistically count the historical data of the uplink and downlink bandwidth, make predictions, and count the receiving buffer of the broadcaster end, and then adopt a periodic bitrate adjustment strategy which utilizes the adaptive bitrate adjustment method at equal intervals and inputs new statistical data. According to the new statistical data, calculate the new bitrate as the encoding parameter and output to the encoder, and finally a feedback closed loop is formed.

In summary, the present invention provides an adaptive bitrate adjustment scheme for multi-user interactive live broadcast. First, a non-linear programming scheme is used to process complex constraint conditions and obtain the target bitrate between each pair of broadcasters. Then the target bitrate is adjusted according to the online buffer feedback to correct the prediction error. Finally, the actual bitrate of the broadcasters is determined by using a QoE-loss-based clustering algorithm. This method takes into account various constraints of the overall situation, which includes the uplink and downlink bandwidth and the buffer occupancy of the broadcaster, and the actual bitrate of the final output can maximize the user experience of the broadcaster.

What is claimed is:

1. An adaptive bitrate adjustment method for multi-user interactive lie broadcast, comprising steps of:

(a) calculating a target bitrate of each pair of sending end and receiving end by using a nonlinear programming method, which comprises the steps of:

utilizing an adaptive bitrate adjustment controller at a server end to read a buffer occupancy amount of each broadcaster and a bandwidth prediction value of uplink and downlink, when calculating the target bitrate $\hat{R}_w^{ij}$ for each pair of sending end and receiving end, considering limitations of uplink and downlink bandwidth and a receiving buffer of a broadcaster end in order to maximize a system of Quality of Experience (QoE), that is:

$$\max_{\hat{R}_w^{ij}} \quad QoE$$

$$\text{s.t.} \quad \hat{B}_{w+1}^{down(ij)} = \left( B_w^{down(ij)} - \frac{S_w^{ij}}{C_w^{down(ij)}} \right)_+ + D_w^{ij}$$

-continued $$\max_j\{\hat{R}_w^{ij}\} \le C_w^{up(i)}$$

$$\sum_i \hat{R}_w^{ij} \le C_w^{down(j)}$$

wherein each parameter is defined as:
QoE: Quality of Experience, user experience
$\hat{R}_w^{ij}$: The target bitrate corresponding to a wth frame sent by a broadcaster i to a broadcaster j;
$\hat{B}_w^{down(ij)}$: a target buffer amount of the receiving end when the broadcaster j starts to receive the wth frame from the broadcaster i;
$B_w^{down(ij)}$: an actual buffer amount of the receiving end when the broadcaster j starts to receive the wth frame from the broadcaster i;
$S_w^{ij}$: a frame size corresponding to the wth frame sent by the broadcaster i to the broadcaster j;
$D_w^{ij}$: a frame duration corresponding to the wth frame sent by the broadcaster i to the broadcaster j;
$C_w^{up(i)}$: an average uplink bandwidth when the broadcaster i sends the wth frame;
$C_w^{down(j)}$: an average downlink bandwidth when the broadcaster j receives the wth frame;
$(x)_+ = \max\{x,0\}$: a maximum value taken from x and 0;
$C_w^{down(ij)}$ refers to the average downlink bandwidth when the broadcaster j receives the wth frame from the broadcaster i, and $\Sigma_i C_w^{down(ij)} = C_w^{down(j)}$;
   (b) adjusting and online updating target bitrate through buffer feedback to eliminate systematic errors in modeling and measurement process, and
   (c) clustering the target bitrate based on QoE loss to obtain a final actual bitrate.

2. An adaptive bitrate adjustment method for multi-user interactive live broadcast, comprising the steps of:
   (a) calculating a target bitrate of each pair of sending end and receiving end by using a nonlinear programming method;
   (b) adjusting and online updating target bitrate through buffer feedback to eliminate systematic errors in modeling and measurement process by mainly using a Proportional Integral (PI) controller,
   which comprises the sub-steps of:
   (b-i), in order to eliminate prediction errors, using a proportional controller to calculate a difference between an actual buffer occupancy and a target buffer occupancy: $Z_p = K_p(B_{w+1}^{down(ij)} - \hat{B}_{w+1}^{down(ij)})$, where $Z_p$ is the proportional term of the PI controller, and $K_p$ is a proportional coefficient of the PI controller;
   (b-ii), in order to eliminate accumulated systematic errors, using an integral controller to integrate the difference between the actual buffer occupancy and the target buffer occupancy: $Z_i = K_i \int_0^{w+1} (B_t^{down(ij)} - \hat{B}_t^{down(ij)})dt$, where $Z_i$ is the integral term of the PI controller, and $K_i$ is an integral coefficient of the PI controller;
   (b-iii), based on buffer feedback adjustment, obtaining a final updated target bitrate value: $\hat{R}_{w+1}^{ij} = \hat{R}_w^{ij} + Z_p + Z_i$, and
   (c) clustering the target bitrate based on Quality of Experience (QoE) loss to obtain a final actual bitrate.

3. An adaptive bitrate adjustment method for multi-user interactive live broadcast, comprising the steps of:
   (a) calculating a target bitrate of each pair of sending end and receiving end by using a nonlinear programming method by utilizing an adaptive bitrate adjustment controller at a server end,
   (b) adjusting and online updating target bitrate through buffer feedback to eliminate systematic errors in modeling and measurement process by utilizing a Proportional Integral (PI) controller;
   (c) clustering the target bitrate based on Quality if Experience (QoE) loss to obtain a final actual bitrate by defining QoE loss as $QoE(R_w^{ij}) - QoE(\hat{R}_w^{ij})$, performing K—means clustering in a space formed by the bitrate and the corresponding QoE to obtain a value of actual bitrate $R_w^{ij}$ that minimizes the overall QoE loss.

* * * * *